April 19, 1960   G. A. BOUVIER   2,933,299
ACCELEROMETER AND INTEGRATOR
Filed Dec. 15, 1954   5 Sheets-Sheet 1

*INVENTOR.*
GEORGE A. BOUVIER
BY
*William R. Lane*
ATTORNEY

April 19, 1960  G. A. BOUVIER  2,933,299
ACCELEROMETER AND INTEGRATOR
Filed Dec. 15, 1954  5 Sheets-Sheet 3

INVENTOR.
GEORGE A. BOUVIER
BY
William P. Lane
ATTORNEY

April 19, 1960  G. A. BOUVIER  2,933,299
ACCELEROMETER AND INTEGRATOR
Filed Dec. 15, 1954                          5 Sheets-Sheet 4

INVENTOR.
GEORGE A. BOUVIER
BY
William P. Lane
ATTORNEY

United States Patent Office 2,933,299
Patented Apr. 19, 1960

2,933,299

ACCELEROMETER AND INTEGRATOR

George A. Bouvier, Sierra Madre, Calif., assignor to North American Aviation, Inc.

Application December 15, 1954, Serial No. 475,389

14 Claims. (Cl. 264—1)

This invention pertains to the measurement of acceleration and the integrating of acceleration to obtain velocity and distance by the use of a rotating mass. It more particularly relates to a motor which is caused to rotate at a speed dependent upon the deflections of a restrained mass.

Extremely sensitive distance meters and accelerometers are desirable as flight instruments in aircraft. Providing suitable accuracy can be obtained, a distance meter which integrates all the accelerations of an aircraft to provide velocity and distance traveled is more desirable than methods which require information from ground sources or methods which are subject to errors of drift such as that due to wind.

A particular feature of this accelerometer lies in the fact that the integrating portion can be located remotely from the sensitive portion. Therefore, it can be said that the sensitive portion of this distance meter could represent a fraction of the size of ordinary accelerometers and can be made correspondingly more sensitive for the same weight. This may be an especial advantage in those instances where the orientation of the sensitive portion of the distance meter is servo controlled. This is because mass is a factor in the performance of a servo system. The sensitive portion having substantially no moving parts, except incipient deflection of a small mass, exerts far less influence upon its supporting structure in this instance.

It is therefore an object of this invention to provide inertial means for measuring acceleration.

It is a further object of this invention to provide a mass which rotates in accordance with the deflection of another mass.

It is still another object of this invention to provide a distance meter in which the integrating portion may be located remotely from the acceleration sensitive portion.

It is still another object of this invention to provide an integrating device which is especially matched to receive the output of an acceleration indicating device.

A still further object of this invention is to provide an acceleration sensitive device which is small in size and of relatively simple construction.

Other objects of invention will become apparent from the following description taken in connection with the accompanying drawings, in which.

Figure 1:
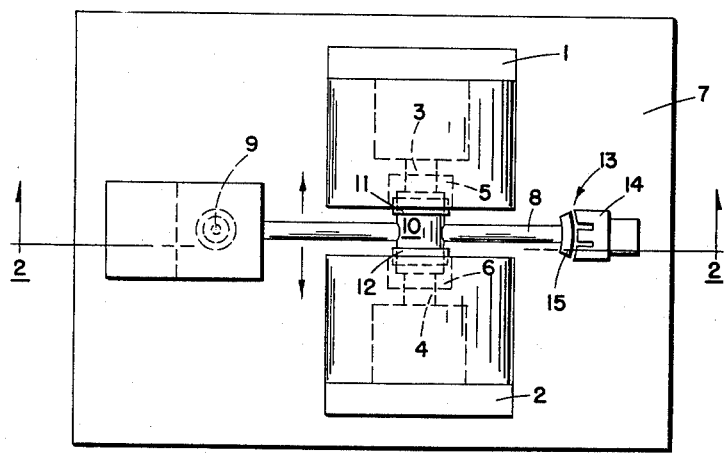
Fig. 1 is a plan view of the acceleration sensitive portion of this invention.

Referring now to Fig. 1, permanent magnets or electromagnets 1 and 2 have pole pieces 3 and 4 around which are situated annular air gaps 5 and 6. These magnets are rigidly mounted with respect to base 7. Pivotal arm 8 is a pendulous mass which is pivoted at 9 providing a freedom of motion in the direction indicated by the arrows. Intermediate the length of arm 8 is a coil form 10 upon which are wound coils 11 and 12, which lie within air gaps 5 and 6, respectively. At the remote end of pendulous mass 8 is indicated an E-type pickoff 13 consisting of E-core 14 and armature 15 which provides indication of the deflection of arm 8. Coils 11 and 12 when energized provide for torquing arm 8 to a null position as indicated by the E-type pickoff.

The pivot arm 8 is carried in a low friction pivot bearing at 9, such as jewel type bearings capable of supporting this mass. Pendulous mass 8 could be flexure mounted, floated, suspended, or mounted by any suitable means having minimum friction and restriction of motion with respect to its mountings. Further, mass 8 could be mounted for restrained, rectilinear motion if torque effects are to be avoided. In such a case, coils 11 and 12 are located to produce restoring forces rather than torques on mass 8. Note, also, that the "acceleration detector" could be of other known types such as a typical gyroscope type. There also may be imposed such damping or biasing as may be desirable.

Figure 2:
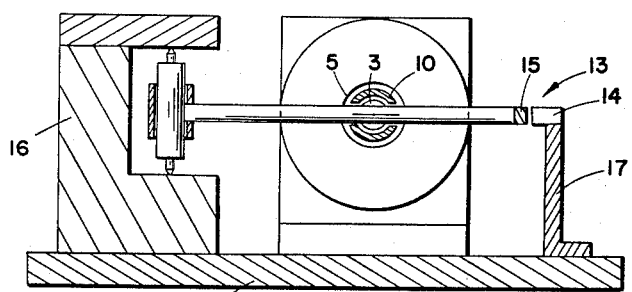
Fig. 2 is a section taken on line 2—2 of Fig. 1.

Fig. 2 is a sectional taken on lines 2—2 of Fig. 1, and indicates, in general, the pivotal mounting of arm 8 with respect to base 7 and upright support 16. Pickoff 13 is supported with respect to base 7 by bracket 17. Further details of the construction of this device are indicated in patent application Serial No. 57,816, by Shirley F. Eyestone et al., filed November 1, 1948, for an Accelerometer.

Figure 3:
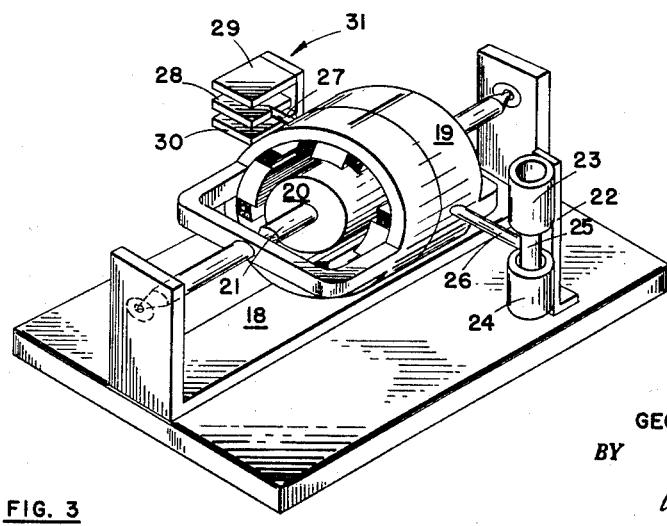
Fig. 3 is a rudimentary perspective showing the integrating portion of the device together with pickoff and torquer.

Fig. 3 illustrates a device for mechanically indicating the sensed outputs of the device of Fig. 1. This device consists of a base upon which is located a mounting bracket 18 which supports a pivotal, two-phase, wound stator 19 through the use of low friction bearings. Disposed to rotate within pivotal stator 19 is an induction rotor 20 upon shaft 21. Bracket 22 supports electromagnetic torquing coils 23 and 24 which attract or repel magnet 25 located upon arm 26 which is connected to stator 19. In this manner, stator 19 can be torqued in either direction depending on the direction of flow of current through coils 23 and 24. Also connected to stator 19 is arm 27 and capacitor plate 28 which is disposed between capacitor plates 29 and 30 which are mounted rigidly with respect to the base of bracket 18. This structure provides pickoff 31 in which plates 28 and 29 provide a capacitor and plates 28 and 30 provide another capacitor. The relative values of unbalance between the two capacitors can be detected by a bridge circuit to provide a signal as to the deflection, or incipient rotation, of stator frame 19. Other type pickoffs which are non-coercive in nature, such as inductive or optical pickoffs, are likewise suitable. Further description of an integrating device similar to Fig. 3 is contained in application Serial No. 57,686 in the name of John M. Wuerth, filed November 1, 1948, for Accelerometer and Integrator.

Figure 4:
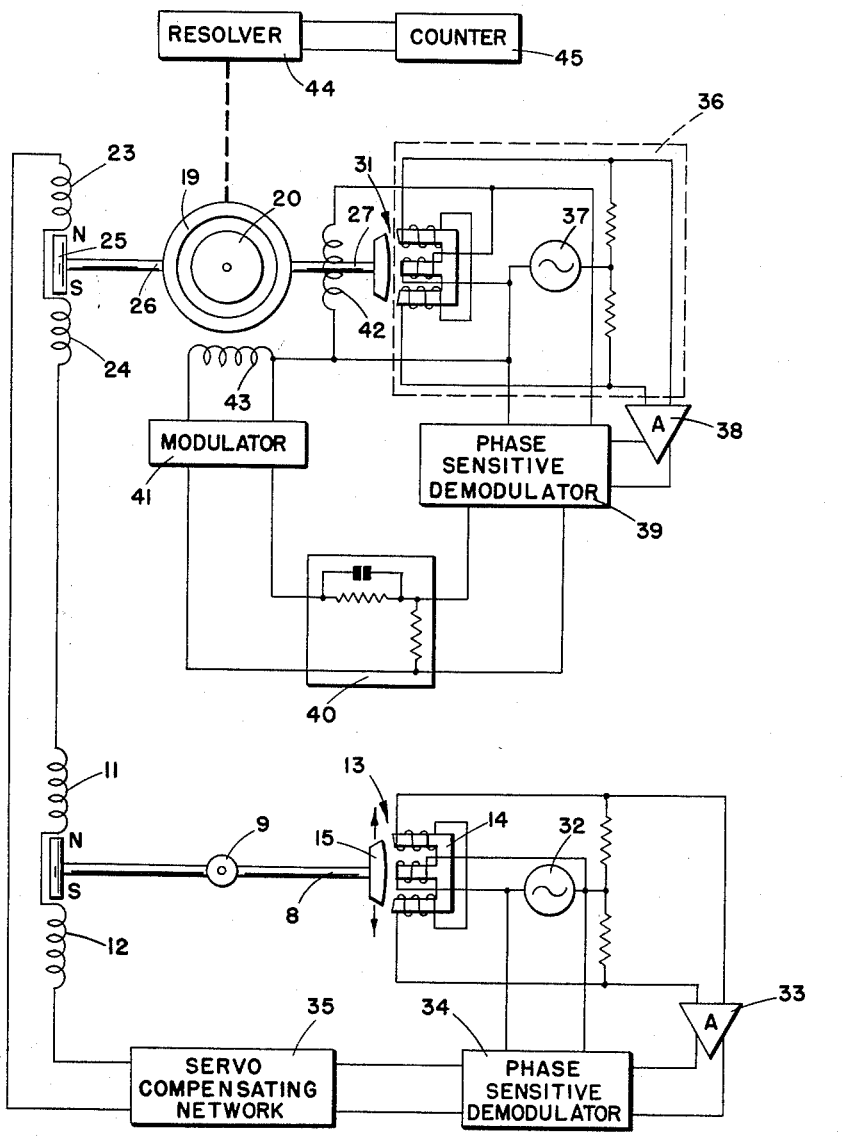
Fig. 4 is a schematic diagram of the electrical circuit of the device.

In the schematic of Fig. 4 is shown how the acceleration sensitive portion of Fig. 1 cooperates with the integrating characteristics of the device of Fig. 3. Assuming that inertially-free arm 8 experiences acceleration in the direction indicated by one of the arrows, it will, therefore, deflect the armature 15 of E-type pickoff. A.-C. source 32 excites the center limb of E-core 14 and soft iron armature 15 magnetically couples the excitation into the oppositely-wound outer limbs. If armature 15 is deflected to one side or the other, one limb is better coupled to the center limb and an A.-C. output signal is provided which is amplitude modulated and phase-reversible, to amplifier 33 which in turn provides an output signal to phase-sensitive demodulator 34. Demodulator 34 receives a reference frequency from source 32 and provides a D.-C. signal, then, whose polarity indicates the direction of deflection of arm 8 and whose amplitude indicates the amount of deflection. The output of demodulator 34 flows through a servo stablizing or compensating network 35. Such networks are well known in the art. The network output is fed to torquing coils 11 and 12 which act to restore arm 8 back into an undeflected position. Depending upon the tightness of the servo loop, arm 8 will be maintained in substantially an undeflected position and only incipient deflection will occur. The current flowing through coils 11 and 12 also flows through torquer coils 23 and 24 which act to deflect permanent magnet 25 and slightly rotate stator 19. As stator 19 commences to rotate, the pickoff 31, illustrated as E-type, becomes relatively unbalanced and provides an unbalance which is sensed in bridge circuit 36 which detects the unbalance by utilizing the pickoff 31 in a bridge network. A.-C. source 37 provides current to the center limb of pickoff 31 and to bridge circuit 36 which provides an A.-C. output signal to amplifier 38 which is amplitude modulated and phase-reversible and thus indicates the deviation of stator 19 from its normal position. The signal then is transmitted to phase-sensitive demodulator 39 which receives a reference frequency from source 37 and provides a D.-C. output whose magnitude indicates the amount of deflection of stator 19 and whose polarity indicates the direction of displacement. The signal is then received by equalizing or servo compensating network 40 to add stabilization to the servo loop control of the device. A modulator 41 receives the output of network 40 and sends it to quadrature winding 43 of stator 19 which acts to speed up or slow down the rotation of rotor 20. As rotor 20 rotates, the reaction force developed between it and its stator 19 acts to counter-pivot stator 19 and restore it to an undeflected position.

In summary, then, closed loop servo control is had in which an inertia sensitive mass is deflected by acceleration, it is forced back to null, the same forcing current is used to rotate a second mass (stator) whose rotor is made to rotate and impart to the second mass a restoring angular momentum. Again, depending on the tightness of the loop, stator 19 deflects very little and is maintained substantially in an undeflected position by the servo loop. Rotor 20 rotates at a speed and in a direction dependent on the deflection of arm 8. In Fig. 4, the velocity at which rotor 20 rotates is the first integration of the current flowing through torquer coils 11 and 12 and, therefore, is the first integral of the acceleration sensed by pivotal arm 8. The number of rotations rotor 20 experiences is the second integral of the current and is indicative of distance traveled. Tachometer, or resolver 44, connected to rotor 20 provides by its speed an indication of velocity. A counter 45 adapted to count the rotations of resolver 44 indicates distance traveled.

Figure 5:
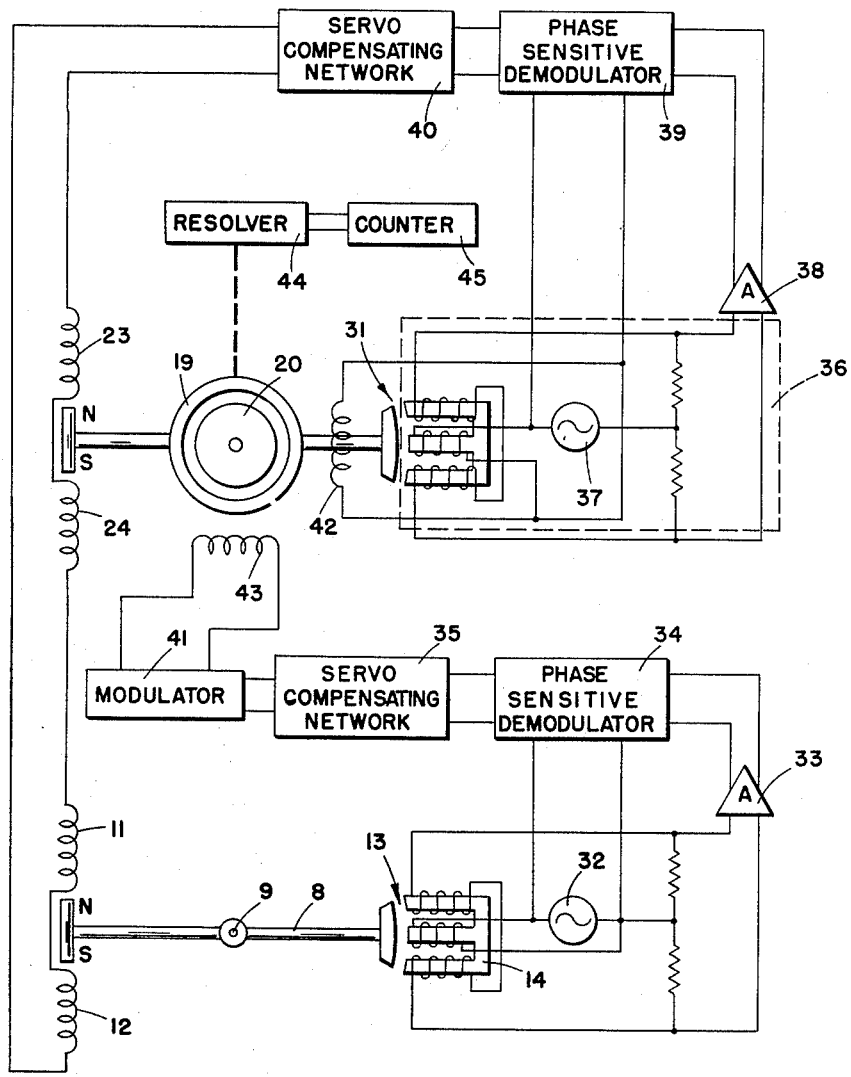
Fig. 5 is a second schematic diagram using the concept of the invention.

Fig. 5 is an alternate arrangement of the device of the invention in which the stator is deflected in another manner. The output of servo compensating network 35 is connected, instead, to modulator 41 and to quadrature winding 43 of wound stator 19. In this way, stator 19 is caused to deflect by the reactive force of the rotor 20 which rotates according to the deflection of arm 8 directly, rather than indirectly. The deflection of stator 19 is sensed by pickoff 31 and provided through bridge circuit 36 to amplifier 38. Phase demodulator 39 changes the signal to D.-C., and servo compensating network 40 provides the required compensation to stabilize the servo loop. The signal is then fed to torquing coils 23, 24, 11, and 12, all in series, to return the stator 19 and unbalanced arm 8 to undeflected positions.

In the illustration of Fig. 5, the stator is torqued into deflection by its reactive force with the rotor and countertorqued to an undeflected position by the torquer. In the illustration of Fig. 4, the stator is torqued into deflection by the torquer and countertorqued to an undeflected position by its reactive force with the rotor.

Figure 8:
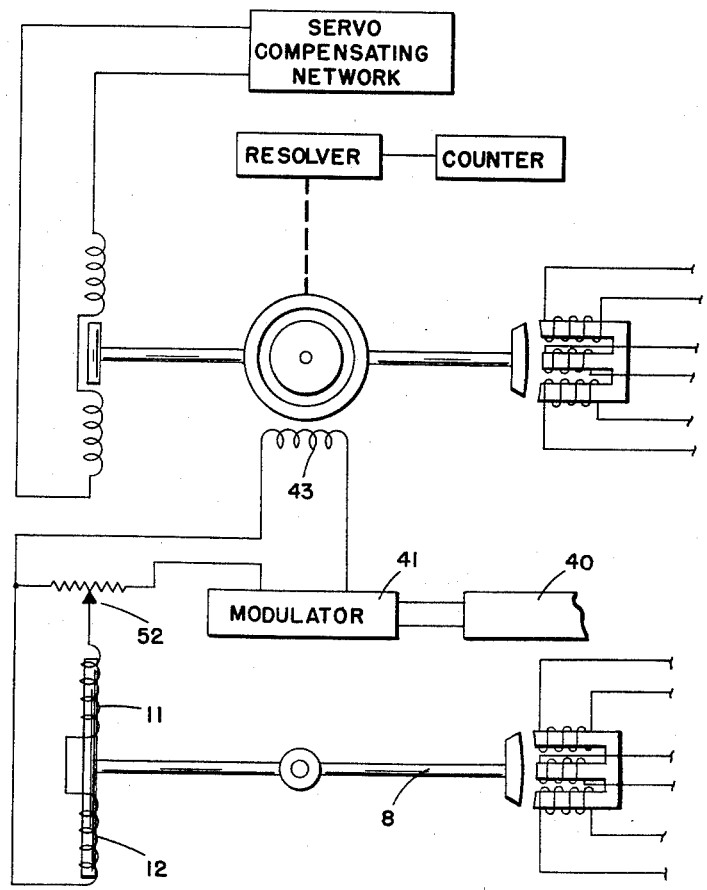
Fig. 8 is a third schematic using the concept of the invention.

Fig. 8 is a modification of the device of Fig. 5, in which the torquing coils 11 and 12 are connected in series with A.-C. motor winding 43. Voltage dividing resistor 52 operates to adjust the current through torquing coils 11 and 12.

Figure 6:
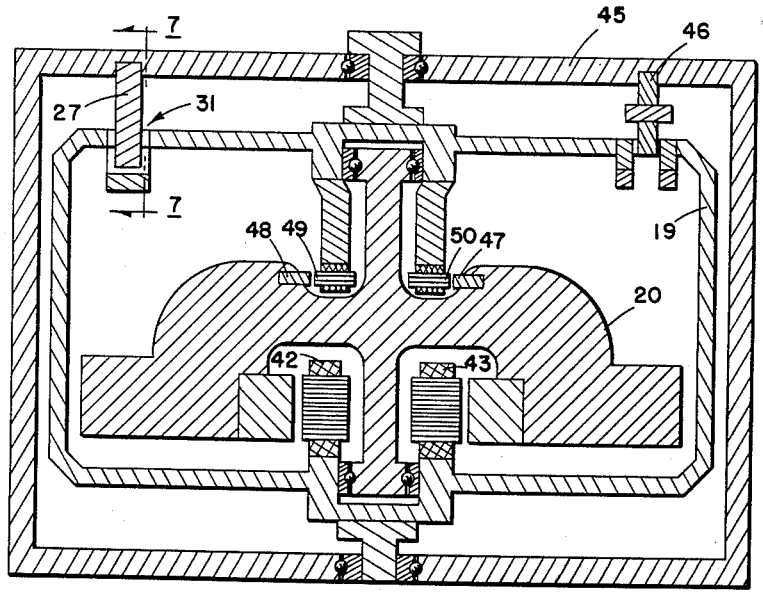
Fig. 6 is a cross-section of an integrating device embodying the principles illustrated in Fig. 3.

Fig. 6 illustrates a wound stator construction of the integrating device of Fig. 3. Stator 19 is bearing mounted within enclosing case 45 and is provided with a torquer 46 with respect to the case and a pickoff 31 with respect to the case. The first causes deflection with respect to the case, and the second indicates deflection with respect to the case. Within stator 19 is bearing-mounted induction rotor 20 which rotates with respect to the windings 42 and 43 of stator 19. Rotor 20 also carries a resolver, or generator, consisting of permanent magnets 47 and 48 which together with wound coils 49 and 50 provide an A.-C. output indicating the number of rotations of rotor 20. This particular generating scheme may be used to drive the counter 45 shown in Fig. 4.

Figure 7:
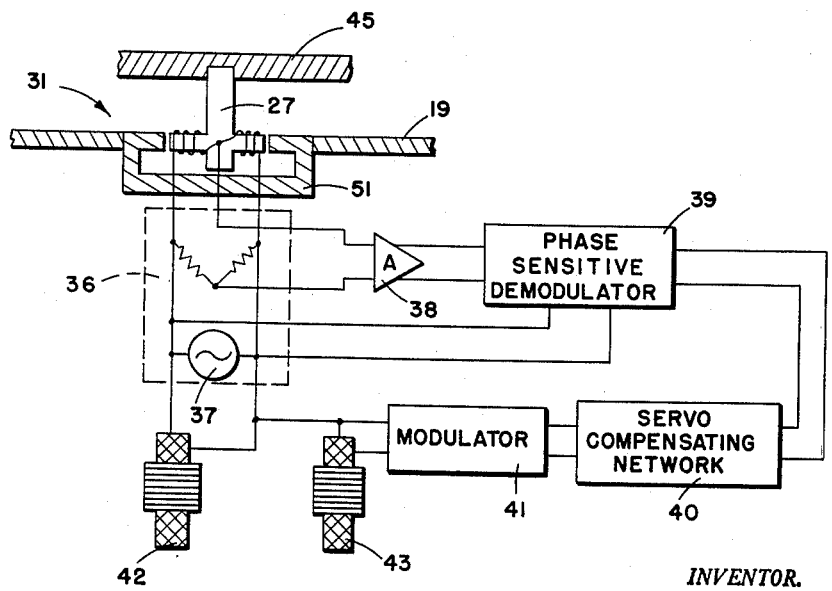
Fig. 7 is a section taken on line 6—6, Fig. 6, of pickoff 41, together with electrical connections.

Fig. 7 further illustrates pickoff 31 taken at line 7—7 in Fig. 6 in which a C-core 51 of soft iron is connected to stator 19. The pickoff armature bar 27 is connected to case 45 and is composed of two arms upon which are located windings connected through bridge circuit 36 to amplifier 38. Source 37 through the arms of the bridge provides a signal to phase-sensitive demodulator 39 in accordance with the deflection of armature bar 27. The D.-C. output of demodulator 39 indicates by its polarity the sense of deflection of stator 19 and by its amplitude the amount of deflection. The output of demodulator 39, according to the circuit of Fig. 4, is received by servo compensating network 40, modulator 41 and then quadrature winding 43. The rotor 20 is caused to rotate by the flux produced by stator windings 42 and 43. As rotor 20 rotates, a reaction force is developed on stator 19 which restores it to an undeflected position which is indicated by pickoff 31.

The device of the invention allows a relatively small, inertia-sensitive device (shown in Fig. 1) to be used as part of an autonavigator, for example, wherein its orientation is servo-controlled and its integrating motor, Figs. 4, 5, and 6, is located remotely.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In combination a first mass disposed to deflect under the influence of acceleration, a second mass, first torque producing means responsive to the deflection of said first mass, said torque producing means disposed to torque said second mass in accordance with the deflection of said first mass, means for counterdeflecting said first mass and second torque producing means for torquing said second mass so as to maintain said first and second masses in undeflected positions.

2. The combination recited in claim 1 wherein said means for counterdeflecting and said second torque producing means are connected in series.

3. The combination recited in claim 1 wherein is included a motor and said second mass is a pivotal stator of said motor and one of said first and second torquing means comprises an electromagnetic coil and the other comprises a winding of said motor.

4. In combination, a first mass disposed to deflect under the influence of acceleration, first force producing means, said first force producing means disposed relative to said first mass so as to maintain said mass in substantially an undeflected position, torque producing means responsive to the deflection of said first mass, a second mass, said torque producing means disposed to torque said second mass whereby said second mass is torqued in accordance with the force required to maintain said first mass in an undeflected position, means for countertorquing said second mass so as to maintain it in an undeflected position.

5. In combination, a first mass disposed to deflect under the influence of acceleration, a second mass, first torque producing means responsive to the deflection of said first mass, said torque producing means disposed to torque said second mass in accordance with the deflection of said first mass, means for counterdeflecting said first mass and second torque producing means for torquing said second mass so as to maintain said first and second masses in undeflected positions and wherein said second mass is a pivotal stator of a motor.

6. In combination, a first mass disposed to deflect under the influence of acceleration, force producing means responsive to the deflection of said first mass, said force producing means disposed relative to said first mass so as to maintain said mass in substantially an undeflected position, first torque producing means, an integrating motor, comprising a reference frame and a stator pivotally mounted with respect to said reference frame, said first torquing means responsive to the deflection of said first mass for torquing said stator with respect to said reference frame, second torquing means responsive to the deflection of said stator for maintaining said stator in an undeflected position.

7. The combination recited in claim 6 wherein said second torquing means is the rotor of said integrating motor.

8. In combination, a mass disposed to deflect under the influence of acceleration, first pickoff means disposed relative to said mass to sense deflection thereof, force producing means responsive to said pickoff means, said force producing means disposed relative to said mass so as to maintain said mass in substantially an undeflected position, an integrating motor comprising a reference frame, and a stator pivotally mounted with respect to said reference frame, first means for torquing said stator in response to the output of said pickoff means, second pickoff means disposed relative to said stator so as to detect any deflection between said stator and said reference frame, second means for torquing said stator in response to said second pickoff means so as to restore said stator to an undeflected position.

9. In combination, a mass disposed to deflect under the influence of acceleration, pickoff means disposed relative to said mass to detect deflection thereof, first and second electromagnetic means responsive to the output of said pickoff means, said first electromagnetic means disposed relative to said mass so as to maintain said mass in substantially an undeflected position, an integrating motor comprising a reference frame, a rotor, and a stator pivotally mounted with respect to said reference frame, said second electromagnetic means disposed to torque said stator with respect to said reference frame, pickoff means disposed relative to said stator so as to detect deflection thereof with respect to said reference frame, means for controlling the rotation of said rotor in accordance with the output of said latter pickoff means so as to maintain said stator substantially in an undeflected position.

10. In a distance meter, a pivotal mass disposed to deflect about an axis under the influence of acceleration, pickoff means disposed relative to said pivotal mass to detect deflection thereof, first and second electromagnetic torquer means connected in series and responsive to the output of said pickoff means, said first electromagnetic torquer disposed relative to said pivotal mass so as to maintain said pivotal mass in substantially an undeflected position, an integrating motor comprising a reference frame, a rotor, and a stator pivotally mounted with respect to said reference frame, said second electromagnetic torquer disposed relative to said stator so as to torque said stator relative to said reference frame, pickoff means disposed relative to said stator so as to detect deflection thereof, means for controlling the speed of said rotor in accordance with the output of said latter pickoff, means whereby the reaction force developed between said rotor and said stator maintains said stator substantially in an undeflected position.

11. In a distance meter, a pivotal mass disposed to deflect about an axis under the influence of acceleration, pickoff means disposed relative to said first mass to detect deflection thereof, means for producing a D.-C. signal in response to the output of said pickoff which D.-C. signal represents by its polarity the direction of deflection as indicated by said pickoff and by its magnitude the amount of deflection as indicated by said pickoff, first and second electromagnetic torquer means connected to receive said D.-C. signal, said first electromagnetic torquer means disposed relative to said pivotal mass whereby said pivotal mass is maintained in substantially an undeflected position, an integrating motor comprising a reference frame, a rotor, and a stator pivotally mounted with respect to said reference frame, said second electromagnetic torquing means disposed relative to said stator so as to torque said stator, pickoff means located relative to said stator so as to detect incipient deflection thereof with respect to said reference frame, means for controlling the speed and direction of rotation of said rotor in accordance with the output of said pickoff means whereby the reaction force between said rotor and said stator maintains said stator in substantially an undeflected position.

12. In a distance meter, a pivotal mass disposed to deflect about an axis under the influence of acceleration, pickoff means disposed relative to said first mass to detect deflection thereof, modulating means responsive to said pickoff means to provide a modulated signal in accordance with the deflection of said pivotal mass, means for amplifying said signal, demodulating means connected to receive said modulated signal, first and second electromagnetic torquing means connected to receive the output of said demodulating means, said first electromagnetic torquing means disposed relative to said pivotal mass so as to maintain said pivotal mass in an undeflected position, an integrating motor comprising a reference frame, a rotor, and a stator pivotally mounted with respect to said reference frame, said second electromagnetic torquing means disposed to torque said stator, pickoff means disposed relative to said stator to detect incipient deflection thereof, modulating means responsive to said pickoff means to provide a modulated signal in accordance with the deflection of said stator, means for amplifying said signal, demodulating means connected to receive said modulated signal indicating stator deflection, said demodulating means connected to control the rotation of said motor.

13. The combination recited in claim 12 wherein said modulating means and said pickoffs provide amplitude modulated, phase-reversible signals indicating by their phase the direction of deflection detected by said pickoffs and by their amplitude, the amount of deflection of said pickoffs, and said demodulators are phase-sensitive so as to provide a D.-C. output whose polarity indicates direction of deflection of said pickoffs and whose magnitude indicates the amount of deflection of said pickoffs.

14. In a distance meter, a pivotal mass disposed to deflect about an axis under the influence of acceleration, pickoff means disposed relative to said first mass to detect deflection thereof, modulating means responsive to said pickoff means so as to provide amplitude modulated, phase-reversible signals indicating by its phase the direction of deflection detected by said pickoff and by its magnitude the amount of deflection detected by said pickoff, means for amplifying said signal, phase-sensitive demodulating means connected to receive said modulated signal, first and second electromagnetic torquer means connected to receive the output of said demodulating means, said first electromagnetic torquing means disposed relative to said pivotal mass so as to maintain said pivotal mass in an undeflected position, an integrating motor comprising a reference frame, a rotor, and a stator pivotally mounted with respect to said reference frame, said second electromagnetic torquer means disposed to torque said stator, whereby said stator is torqued in accordance with the torque required to maintain said pivotal mass in an undeflected position, a pickoff disposed relative to said stator to detect incipient deflection thereof, modulating means responsive to said pickoff means to provide an amplitude modulated, phase-reversible signal indicating by its phase the direction of deflection and by its amplitude the amount of deflection of said stator, phase-sensitive demodulating means connected to receive said signal indicating stator deflection, said demodulating means connected to control the speed of rotation and direction of rotation of said rotor whereby the reactor force between said rotor and said stator maintains said stator in an undeflected position.

References Cited in the file of this patent
UNITED STATES PATENTS 2,415,819     Halpert et al. _____ Feb. 18, 1947